(12) United States Patent
Geissler

(10) Patent No.: US 12,341,899 B2
(45) Date of Patent: Jun. 24, 2025

(54) METHOD AND SYSTEM FOR INFORMATION TRANSMISSION

(71) Applicant: ipOcean Global GmbH, Mainz (DE)

(72) Inventor: Holger Geissler, Mainz (DE)

(73) Assignee: ipOcean Global GmbH, Mainz (DE)

( * ) Notice: Subject to any disclaimer, the term of this patent is extended or adjusted under 35 U.S.C. 154(b) by 844 days.

(21) Appl. No.: 17/421,254

(22) PCT Filed: Jan. 4, 2020

(86) PCT No.: PCT/EP2020/050111
§ 371 (c)(1),
(2) Date: Jul. 7, 2021

(87) PCT Pub. No.: WO2020/144123
PCT Pub. Date: Jul. 16, 2020

(65) Prior Publication Data
US 2022/0123942 A1   Apr. 21, 2022

(30) Foreign Application Priority Data
Jan. 7, 2019 (DE) .................... 10 2019 000 023.4

(51) Int. Cl.
*H04L 9/32* (2006.01)
*H04L 9/30* (2006.01)
(Continued)

(52) U.S. Cl.
CPC ............. *H04L 9/3239* (2013.01); *H04L 9/30* (2013.01); *H04L 63/0428* (2013.01); *H04L 9/50* (2022.05)

(58) Field of Classification Search
CPC ..... H04L 9/3239; H04L 9/30; H04L 63/0428; H04L 9/50
See application file for complete search history.

(56) References Cited

U.S. PATENT DOCUMENTS 10,601,585 B1 * 3/2020 Robinson .............. H04L 9/3239
10,979,410 B1 * 4/2021 Byrd ................... H04L 63/0428
(Continued)

FOREIGN PATENT DOCUMENTS

CN   108259169 A   7/2018
CN   108632284 A   10/2018
(Continued)

OTHER PUBLICATIONS

International Preliminary Report on Patentability received for PCT Patent Application No. PCT/EP2020/050111, mailed on Jul. 22, 2021, 21 pages (10 pages of English Translation and 11 pages of Original Document).
(Continued)

*Primary Examiner* — Kambiz Zand
*Assistant Examiner* — Afaq Ali

(57) ABSTRACT

A method for information transmission. In a first transaction step, a first data record is generated by the transmission terminal, and the first data record is transferred to a blockchain. In a first verification step, the first data record in the blockchain is verified and stored as a first verified data record. In a second transaction step, a second data record is generated by the receiver terminal, and the second data record is transferred to the blockchain. In a second verification step, the second data record in the blockchain is verified and stored as a second verified data record. In a data encryption step, encrypted data are generated by the transmission terminal. In a transmission step, encrypted data are transmitted to the receiver terminal. In a data decryption step, a piece of electronic information is made accessible to the receiver.

17 Claims, 9 Drawing Sheets

Figure 1:
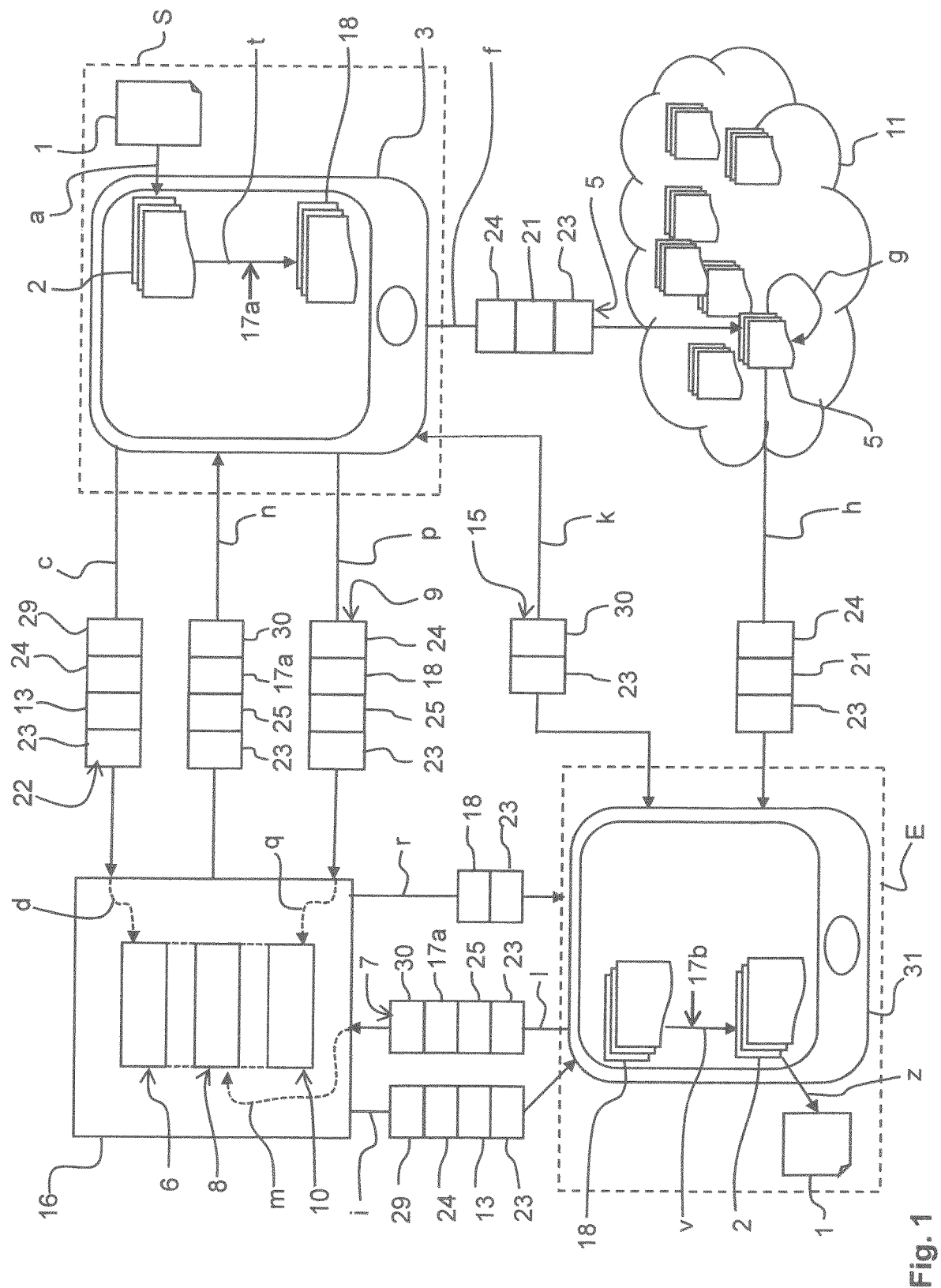

(51) Int. Cl.
 *H04L 9/40* (2022.01)
 *H04L 9/00* (2022.01)

(56) References Cited

U.S. PATENT DOCUMENTS

| | | | |
|---|---|---|---|
| 11,283,778 B2* | 3/2022 | Zhang | ................. H04L 67/1078 |
| 2018/0121918 A1 | 5/2018 | Higgins | |
| 2018/0205555 A1* | 7/2018 | Watanabe | ............. H04L 9/3226 |
| 2018/0247063 A1* | 8/2018 | Li | ........................... G06F 21/62 |
| 2019/0347651 A1* | 11/2019 | Moreno | ............... G06Q 20/385 |
| 2019/0384892 A1 | 12/2019 | Holland et al. | |
| 2021/0090072 A1* | 3/2021 | Sewell | ................. H04L 9/0618 |

FOREIGN PATENT DOCUMENTS

| | | |
|---|---|---|
| DE | 102016118724 A1 | 4/2018 |
| DE | 102017204538 A1 | 9/2018 |

OTHER PUBLICATIONS

International Search Report and Written Opinion received for PCT Patent Application No. PCT/EP2020/050111, mailed on Mar. 20, 2020, 24 pages (10 pages of English Translation and 14 pages of Original Document).

\* cited by examiner

METHOD AND SYSTEM FOR INFORMATION TRANSMISSION

CROSS-REFERENCE TO RELATED APPLICATIONS

This application is a national stage application (under 35 U.S.C. § 371) of PCT/EP2020/050111, filed Jan. 4, 2020, which claims benefit of German Application No. 10 2019 000 023.4, filed Jan. 7, 2019, both of which are incorporated herein by reference in their entirety.

The invention relates to a method for information transmission, wherein electronic information is transmitted from a transmission terminal of a transmitter to a receiver terminal of a receiver. In addition, the invention relates to a system comprising a transmission terminal of a transmitter, a receiver terminal of a receiver and a blockchain, which system is intended to carry out the method for information transmission.

Methods for securing the status and exchange of information are already known, in which methods the status of the information is transmitted encrypted form and stored in one or more databases. Encryption s used here as an attempt to keep the information secret from third parties and also to make it more difficult to tamper with the data. In variants, the data may be stored several times. Furthermore, there are procedures for storing the status and exchange of information in an external database, for example at a service company or at a state institution or other trustworthy institution, such as a supervisory association. However, these procedures have disadvantages under data protection law, since personal data, such as ID card number or date of birth, and the status of sensitive information are stored with third parties either at the service provider the trustworthy state institution or otherwise a trust centre. In addition, the central storage of data with a service provider, such as a platform provider, also entails the risk that the stored data may be changed in one place. Furthermore, in the case of a central service provider, the owner, or rather the transmitter, and the receiver of the information are reliant on the availability of the data service by the service provider. This means that if the service provider switches off the data service, for example, the owner and the receiver of the information no longer have access to the status and exchange of the information. Furthermore, verification of the data by the owner, the receiver or others themselves is not possible, and instead such verification is reliant upon the service of the service provider. It is also difficult in this regard that such solutions may be limited by borders of States, communities of States, or economic areas, so that in such cases these solutions do not allow for security or verification across such borders.

The object of the invention is to provide a method and a system that allows encrypted and tamper-proof information transmission between the transmission terminal of the transmitter and the receiver terminal of the receiver, wherein the transmitter retains control over the information and the transmitter and the receiver are able to keep track of who has what information at what time and at what time the receiver requested the transmission of the information from the transmitter. The information is not known here to the receiver at the start of the process.

The problem addressed by the invention is solved by a method having the features of claim 1, with preferred variants of the invention being described by dependent claims 2 to 15. In addition, the invention is solved by a system having the features of claim 16.

More specifically, the method according to the invention comprises the following steps:
- a first transaction step, in which a first data record having at least one hash value is generated by the transmission terminal and the first data record is transferred to a blockchain,
- a first verification step, in which the first data record in the blockchain is verified and stored as a first verified data record,
- a second transaction step, in which a second data record comprising at least one public receiver key or a receiver identifier is generated by the receiver terminal, and the second data record is transferred to the blockchain,
- a second verification step, in which the second data record is verified in the blockchain and stored as a second verified data record,
- a data encryption step, in which encrypted data are generated by the transmission terminal by means of the public receiver key,
- a transmission step, in which the encrypted data are transmitted to the receiver terminal, and
- a data decryption step, in which the electronic information is made accessible to the receiver by the encrypted data being decrypted by the receiver terminal by means of a private receiver key.

A hash value is understood to mean a value of a data record that may be used to verify the authenticity of this data record. Methods for generating hash values from data records are, for example, MD-2, MD-4, MD-5, SHA-1, SHA-256, LM-Hash, NTLM or Keccak. In particular, the checksum of a data record is a hash value of the data record. The method for generating the hash value does not allow for any details regarding the underlying data record to be disclosed.

The blockchain is a distributed, decentralised database in which data records may be stored in a tamper-proof manner. For this purpose, the data records are stored in a block in which a predecessor hash value of a predecessor block is stored next to the data records. The tamper protection is created by a plurality of trustworthy nodes of a blockchain network, which carry out a verification of the blocks, or a so-called mining or confirmation of the blocks, with a new block being formed preferably at regular intervals and the predecessor hash value of the last available block also being stored. In the verification step, the validity of data records to be stored in the lock is verified. In addition, a so-called cryptographic puzzle is solved, for which the trustworthy nodes have to provide computing capacity, the solving of the cryptographic puzzle also being referred to as proof-of-work verification. The chain of blocks is stored in a multiplicity of nodes, with synchronisation of the nodes in particular, so that the information regarding the transactions is stored redundantly in the network. Since all blocks are formed based on existing blocks by inserting the hash value of the predecessor block into a new block, a chain is formed. The data records verified in the blockchain may be traced back to an initial block, also called a genesis block, through the linking of the blocks. A mismatch, or tampering, of a data record in the chain may be traced because, for example, the content of a data record no longer matches previous versions. The transferred data records are therefore stored as verified data records in each verified blockchain, protected against tampering. For example, it would be possible to trace a change to an already verified data record by forming a checksum over the existing blocks.

The verified data records have further data, for example a timestamp, the length of the data record and/or a checksum of the transferred data records. In particular, a checksum of all stored data in the blocks of a blockchain network is formed as a hash value, with cryptographic hash functions being used in particular.

Encryption is the conversion of a data record in "plaintext", such as a clearly readable text, into a "ciphertext", i.e. an incomprehensible string of characters. The terms "plaintext" and "ciphertext" shall be considered to be symbolic. All types of data or data records may be encrypted, such as text messages, voice messages, recorded images or the source code of programs. When decrypting, the plaintext is re-obtained from the encrypted data record. A distinction is made between different classical and modern symmetric encryption methods and asymmetric encryption methods.

In a symmetric encryption method, the transmitter and receiver have the same key. In the present invention, the transmitter key is a key of a symmetric encryption method. Known methods are, for example, AES, DES, Triple-DES, Blowfish, Twofish, Cast-128, Cast-256, RC2, RC4, RC5, or RC6.

In the asymmetric encryption method, the key consists of a key pair: the public key and the private key, which are different from each other. There is only one private key corresponding to the public key. The public key is used to encrypt the data and the private key to decrypt the encrypted data, or vice versa. Common methods for asymmetric encryption are RSA, Diffie-Hellmann-Merkle, McElice or Elgamal. The public key is circulated, while the private key is accessible only to the persons who are to decrypt the data records encrypted with the public key or who are to encrypt data records in a verifiable manner. In the present invention, the public transmitter key, the private transmitter key, the public receiver key and the private receiver key are keys of an asymmetric encryption method.

The data records transferred to the blockchain are digitally signed. To digitally sign, the transmitter uses asymmetric encryption to calculate a value for a digital data record with the help of a private key, which value is called a digital signature. This value allows anyone to verify the authorship and integrity of the data record using the public key. In order to be able to assign a signature created with a private key to a person, the associated public key must be assigned to that person. In particular, for a digital signature, the private key is usually applied to the hash value of the transferred data record. Insofar as the public key is known, the encrypted hash value may be decrypted due to the fact that there is only one private key corresponding to the public key. By comparing the hash value obtained in this way with the recalculated hash value of the transferred data record, the authorship and integrity of the transferred data record may be verified. This combination of hash methods and asymmetric encryption methods may be combined with other methods, such as the so-called padding method, to improve the digital signature. Known methods for digital signing are, for example, RSA, RSA-FDH, RSA-PSS, RSA-OAEP, DSA, El-Gama Schnorr signature, Pointcheval-Stern signature, XTR, Cramer-Shoup signature, McEliece-Niederreiter signature, Goldreich-Goldwasser-Halevi signature or NTRU.

In the underlying method, the transmission terminal generates a first data record that has a hash value. In particular, this is the hash value of the electronic information that the transmitter wishes to transmit to the receiver. The combination of the first transaction step, in which the first data record with hash value is transferred to the blockchain, and the first verification step, in which the first verified data record is stored in the blockchain, allows the transmitter to prove that it was in possession of the electronic information to be transmitted at the time of the first transaction step, since the hash value enables a unique assignment. For example, the transmitter is able to prove that he had a certain invention at the time of the first transaction step. The advantage of this approach is that, at the time of the first transaction step, the information does not have to be known to the receiver and/or the receiver does not have to be known to the transmitter.

Through the second transaction step and the second verification step, the transmitter obtains the public receiver key of the receiver via the blockchain. On the one hand, the transmitter may take the public receiver key directly from the second verified data record or may use the receiver identifier to obtain the public receiver key from a public database. The second verification step in the blockchain allows the transmitter and the receiver to keep track of the fact that the second transaction step has been carried out and that the receiver has requested the transmission of the information from the transmitter.

By means of the public receiver key, encrypted data are generated by the transmission terminal. In particular, the electronic information is encrypted with the public receiver key.

After the encrypted data has been transmitted to the receiver terminal, the receiver may access the electronic information by decrypting the encrypted data with the private receiver key. In particular, the receiver may access the electronic data by using the private receiver key to decrypt the electronic information encrypted with the public receiver key.

The method for information transmission has the advantage that the transmitter passes on his electronic information only in encrypted form, without it being published. In addition, only the receiver has access to the electronic information. In particular, it is advantageous that the receiver is able to prove that he had the corresponding information at the time of the transaction by verifying the hash value in the blockchain. For example, the transmitter is thus able to prove that he had a certain idea at that time, so that the receiver in particular cannot claim that he had this idea beforehand. In this way, it is easy to verify in the blockchain, in a tamper-proof manner and publicly, who had what information, especially electronic information, and when.

Preferably, one embodiment of the method comprises the following steps:
  a third transaction step, which a third data record is generated by the transmission terminal and transferred to the blockchain and
  a third verification step, in which the third data record is verified the blockchain and stored as a third verified data. record.

Advantageously, the third transaction step and the third verification step make it possible to verify, in a tamper-proof manner, when the transmitter stored the third data record in the blockchain. In particular, the third data record may advantageously be used to transmit data to the receiver in a tamper-proof manner, since the receiver may access the verified third data record by means of the receiver terminal.

Preferably, one embodiment of the method comprises the following steps:
  a fourth transaction step, in which a fourth data record is generated by the receiver terminal and transferred to the blockchain, and a fourth verification step, which the fourth data record is verified in the blockchain and stored as a fourth verified data record.

Advantageously, the fourth transaction step and the fourth verification step make it possible to verify, in a tamper-proof manner, when the receiver stored the fourth data record in the blockchain. In particular, the fourth data record may advantageously be used to document the successful completion of the information transmission in a tamper-proof manner, since the verified fourth data record may be accessed by means of the receiver terminal and transmission terminal.

As a further alternative, is proposed that the following steps exist: The method comprises a third transaction step, in which a third data record is generated by the receiver terminal and transferred to the blockchain, and a third verification step, in which the third data record is stored. In this alternative, the third transaction step and the third verification step make it possible to verify, in a tamper-proof manner, when the receiver stored the third data record in the blockchain. In particular, the third data record may advantageously be used to document the successful completion of the information transmission in a tamper-proof manner, since the verified third data record may be accessed by means of the receiver terminal and transmission terminal.

Preferably, in a further embodiment of the invention, an information identifier is associated with the electronic information, wherein the information identifier is generated by the transmission terminal and transferred to the blockchain as part of the first data record in the first transaction step, or wherein the information identifier is generated by the blockchain and transferred to the transmission terminal in a transfer step, wherein at least the second data record and the third data record comprise the information identifier. Particularly preferred is the information identifier of one of the hash values or a combination of the hash values.

Advantageously, it is thus possible to understand, in a tamper-proof manner, what electronic information is concerned by the transaction steps and the verification steps. In particular, it may be traced that the second data record of the receiver is directed to a specific piece of information, so that it may be traced by the receiver and by the transmitter that the receiver requested a specific piece of information from the receiver at a specific time.

Preferably in a further embodiment of the invention, an announcement step is performed, n which an announcement data record is stored in a database, in particular a cloud, to which the receiver has access via the receiver terminal, wherein the announcement data record comprises at least a description of the electronic information intended for publication and the information identifier.

Advantageously, the transmitter may publish a description of the electronic information via the database, in particular cloud, although this description need not be critical to the publication. For example, he may publish a rough description of an idea in the database without revealing essential details of the idea. If a receiver is interested in the entire electronic information based on the description not critical to the publication, he may request said information through the second transaction step. In addition, the transmitter may advantageously keep track through the first verification step and the receiver may check at what time the transmitter had the electronic information.

Preferably, in a further embodiment of the invention, the database performs a processing step, in which the description of the electronic information and the information identifier are technically processed. For example, keywords of the description are stored in the database. This has the advantage that the receiver may search and find the electronic information more easily in the database, in particular by searching for specific keywords.

Preferably, in a further embodiment of the invention, the method comprises an agreement step, in which an agreement for the transfer of information is exchanged between the transmitter and the receiver. Particularly preferably, the agreement is stored in plaintext or a hash value of the agreement is stored as a part of the second data record in the blockchain.

Advantageously, the agreement step results in an exchange of the conditions for the transfer of the information. In particular, confidentiality agreements are exchanged to ensure that the transfer of an idea to the receiver is not prejudicial to novelty. By storing the information in the blockchain, it is possible to verify, in a tamper-proof manner, that conditions for the transfer of the information are present, and, in the case of stored plaintext, it is possible to ensure that the conditions for the transfer are clear. By combining the second and third verified data record, it is easy to verify in the blockchain, in a tamper-proof manner and publicly, that the receiver and the transmitter knew the conditions.

Preferably, in a further embodiment, the method is characterised in that the transmission terminal generates a hash value of the electronic information and the first data record has said hash value, in that the method comprises a first data encryption step, in which the information is encrypted by the transmission terminal by means of the public receiver key, wherein first encrypted data are generated, and in that the method comprises a first data decryption step, in ch the first encrypted data are decrypted by the receiver terminal by means of the private receiver key, wherein the electronic information is obtained.

Through the generation of the hash value of the electronic information, the first transaction step and the first verification step, the transmitter may advantageously verify that he was in possession of the electronic information at the time of the first transaction step. The electronic information is encrypted by means of the public receiver key, so that only the receiver is able to obtain the electronic information from the first encrypted data. Thus, there is no publication of the electronic information. In particular, an exchange of an idea is not prejudicial to novelty if a confidentiality agreement has previously been concluded between the transmitter and the receiver. Moreover, all transactions may be traced in a tamper-proof manner via the blockchain.

Preferably, in a further embodiment, the method comprises a data transmission step, in which the first encrypted data are transmitted directly from the transmission terminal to the receiver terminal. Particularly preferably, the third data record has a hash value of the first encrypted data.

Advantageously, the electronic information encrypted with the public receiver key is transmitted directly between the transmission terminal and the receiver terminal, so that the transmission is faster and the public is excluded. By transmitting the hash value of the first encrypted data via the blockchain, it may be traced in a tamper-proof manner that the receiver has received the correct first encrypted data from the transmitter.

Particularly preferably, the data transmission step is carried out via at least one separate database, in particular wherein the encrypted data are broken down into a plurality of partial sequences and are only assembled into the encrypted data in the receiver terminal. The database is preferably a cloud. It is particularly preferred that the individual partial sequences are transmitted via different databases. Advantageously, this improves the security of the transmission, since a third party needs all partial sequences of the encrypted data in order to obtain the electronic information. This is made more difficult in particular by the fact that the individual partial sequences of the encrypted data are transmitted via different databases.

Preferably, in a further variant, the method comprises the following steps:
- an information encryption step, in which the transmission terminal encrypts the electronic information by means of a transmitter key or a public transmitter key, wherein encrypted information is generated,
- a second data encryption step, in which the transmission terminal encrypts the transmitter key or the private transmitter key by means of the public receiver key, wherein second encrypted data are generated,
- a second data decryption step, in which the receiver terminal decrypts the second encrypted data by means of the private receiver key, wherein the transmitter key or the private transmitter key is obtained, and
- an information decryption step, in which the receiver terminal decrypts the encrypted information by means of the transmitter key or the private transmitter key, wherein the electronic information is obtained.

Advantageously, this increases the security of the transmission, since two decryption steps have to be carried out to get to the electronic information.

Preferably in a further embodiment of the invention, the transmission terminal generates a hash value of the encrypted information and a hash value of the transmitter key or the private transmitter key, wherein the first data record comprises these two hash values. Advantageously, it may thus be verified in a tamper-proof manner via the blockchain that the transmitter had the electronic information at the time of the first transaction and, advantageously, the protection against tampering is thus further increased, since 2 hash values, which are related via an encryption method, are stored in a verified manner.

Preferably, in a further embodiment of the invention, the transmission terminal generates a hash value of the information, a hash value of the encrypted information and a hash value of the transmitter key or the private transmitter key, wherein the first data record comprises these three hash values.

Advantageously, it may be verified in a tamper-proof manner via the blockchain that the transmitter had the electronic information at the time of the first transaction and, advantageously, the protection against tampering is thus further increased, since 3 hash values, which are related via an encryption method, are stored in a verified manner.

In a preferred embodiment of the invention, the encrypted information is part of the announcement data record, so that the encrypted information may be accessed by the receiver terminal via the database.

Advantageously, a transmission of the encrypted information via the blockchain may thus be avoided in order to keep the amount of data of the blocks of the blockchain as small as possible.

In an alternative embodiment of the invention, the encrypted information is part of the first data record or the third data record, so that the encrypted information may be accessed by the receiver terminal via the blockchain.

Advantageously, this makes it possible to verify, in a tamper-proof manner, that the encrypted information has been transferred from the transmitter to the receiver. In an alternative embodiment of the invention, the method comprises a data transmission step, in which the encrypted information is transmitted directly from the transmission terminal to the receiver terminal.

Advantageously, this avoids the transmission of the encrypted information via the blockchain, in order to keep the amount of data of the blocks of the blockchain as small as possible. In addition, it is possible to transmit the information privately. In addition, the encrypted information may be transmitted more quickly by direct means.

Preferably, a further embodiment of the invention additionally comprises the following steps:
- a third data encryption step, in which the transmission terminal encrypts the encrypted information by means of the public receiver key, wherein third encrypted data are produced,
- a data transmission step, in which the third encrypted data are transmitted directly from the transmission terminal of the transmitter to the receiver terminal, and
- a third data decryption step, in which the receiver terminal decrypts the third encrypted data with the private receiver key, wherein the encrypted information is obtained. Particularly preferably, the transmission terminal generates a hash value of the third encrypted data, wherein in particular the third data record comprises this hash value.

Advantageously, this achieves a more secure transmission, since three decryptions are necessary to obtain the electronic information. In addition, the hash value of the third encrypted data, i.e. the encrypted information encrypted by means of the public receiver key, makes it possible to verify in a tamper-proof manner that the transmitter had the electronic information at the time of the third transaction step, namely before the receiver could obtain the information, since the second encrypted data required for decryption, namely the transmitter key or private transmitter key encrypted with the public receiver key, are also available to the receiver via the third transaction step.

Preferably, in a further embodiment, the method comprises a conversion step, in which the information is converted into the electronic information, in particular wherein the information is generated by a measuring device or is a document. In the conversion step, information, in particular a document or a measured value, is converted into electronic information by the transceiver.

Preferably, in another embodiment of the invention, a computer of the blockchain is located in the database.

The method may be executed with different blockchains. Preferably, the method is executed with one blockchain.

A further subject of the invention is a system comprising the transmission terminal, the receiver terminal and the blockchain, wherein these are designed to perform methods described above. Preferably, the system further comprises a database, in particular a cloud. It is particularly preferred that one or more computers of the blockchain are part of the database.

Figure 2:
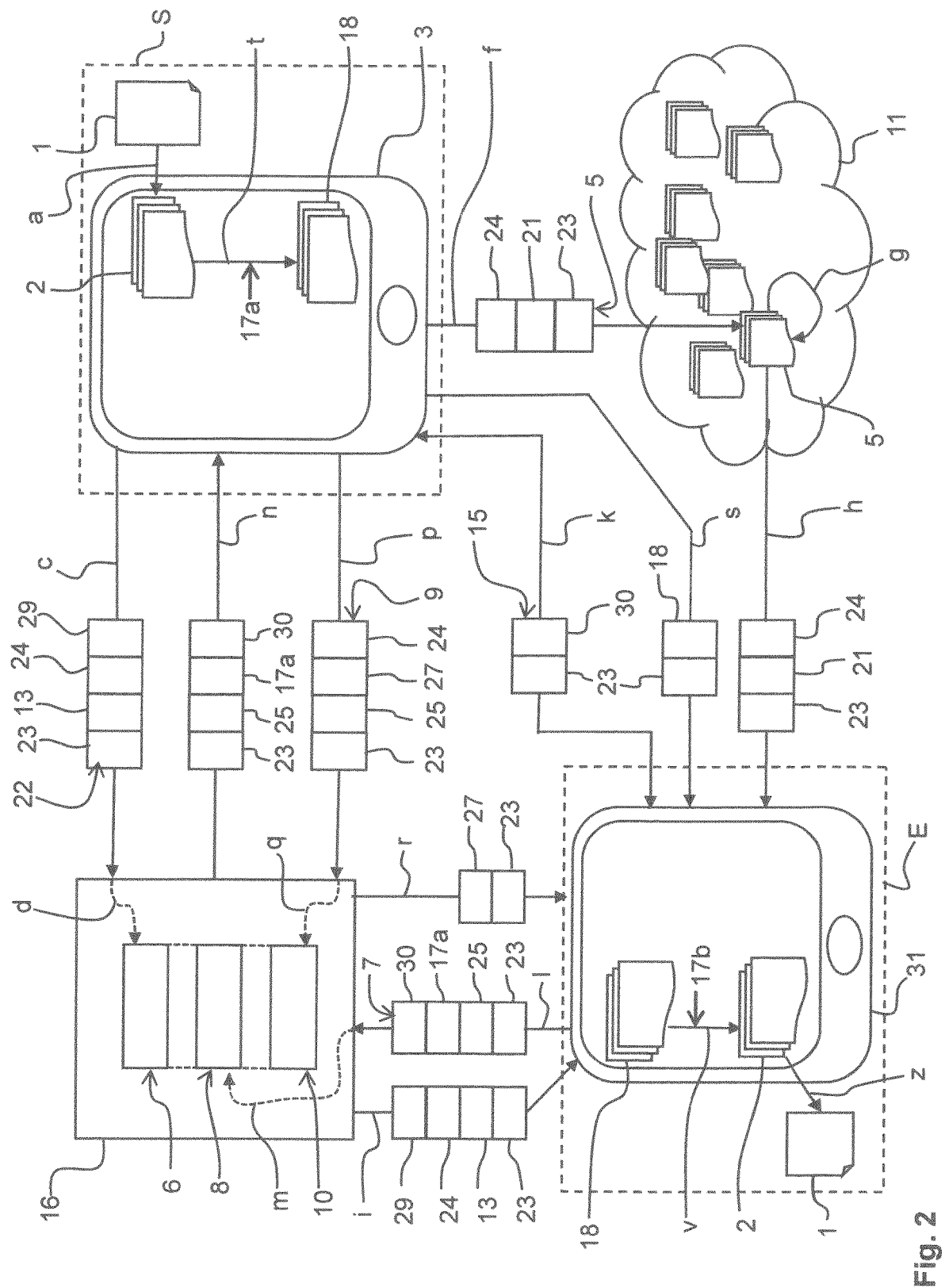
Figure 3:
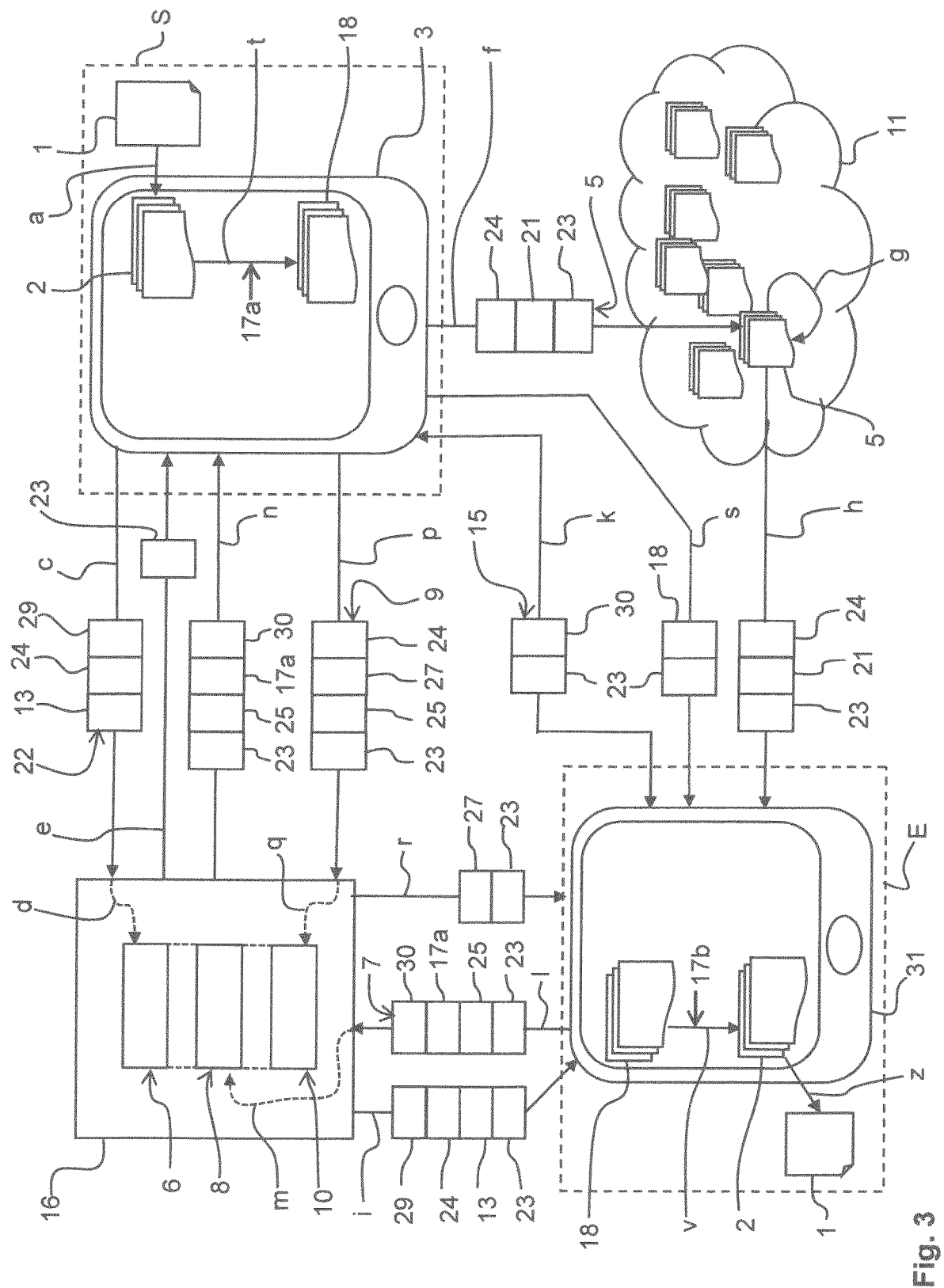
Figure 4:
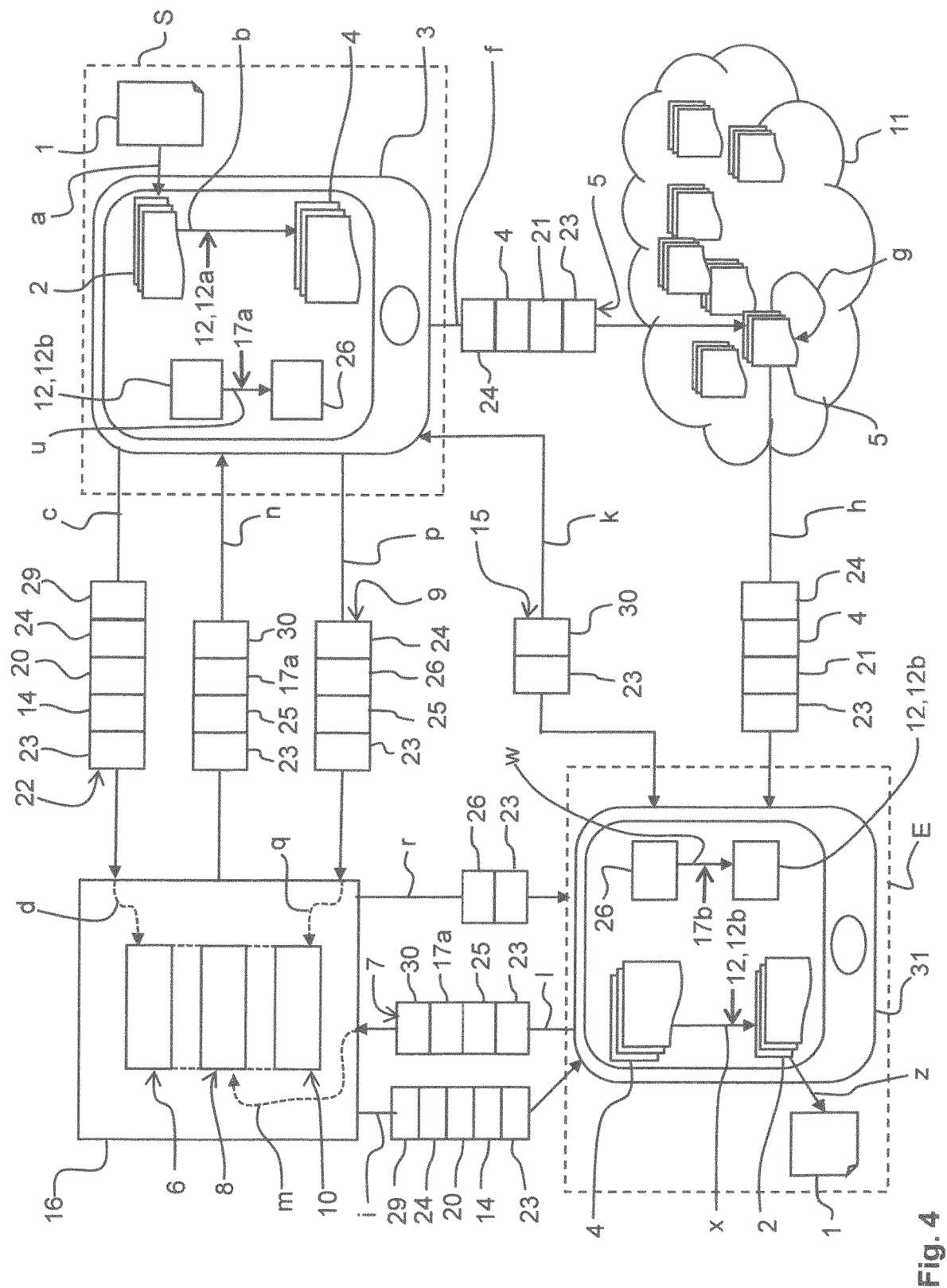
Figure 5:
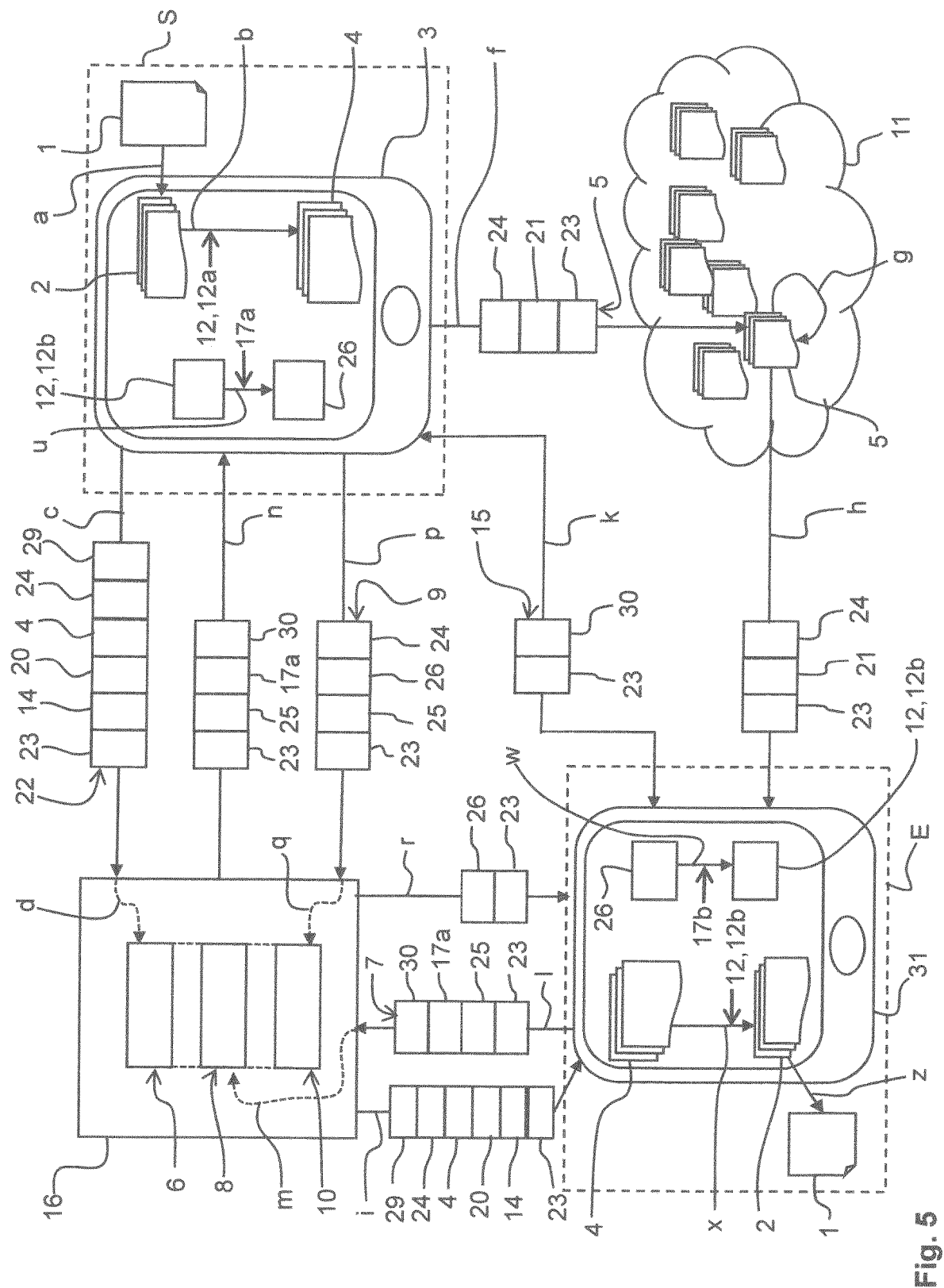
Figure 6:
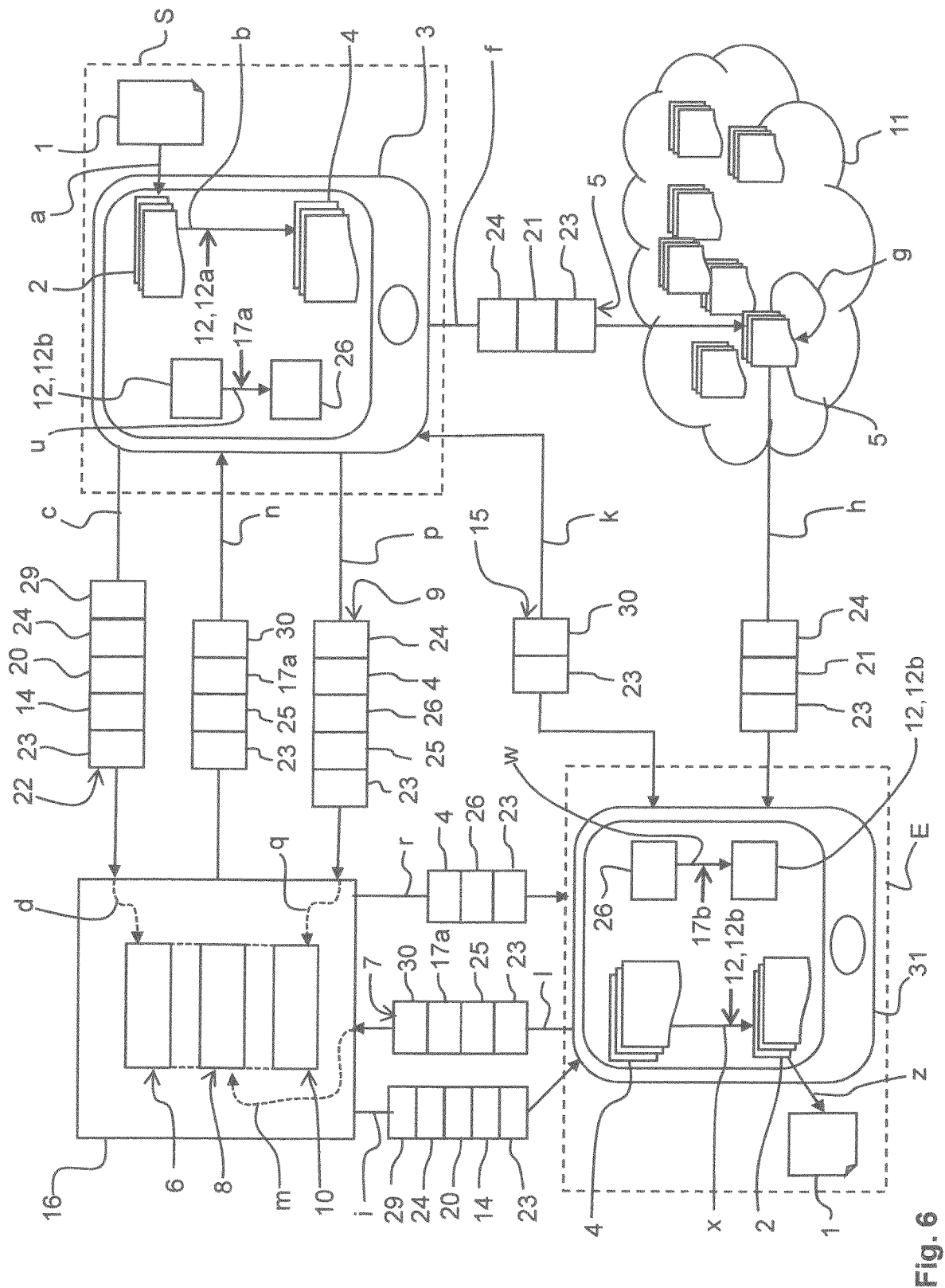
Figure 7:
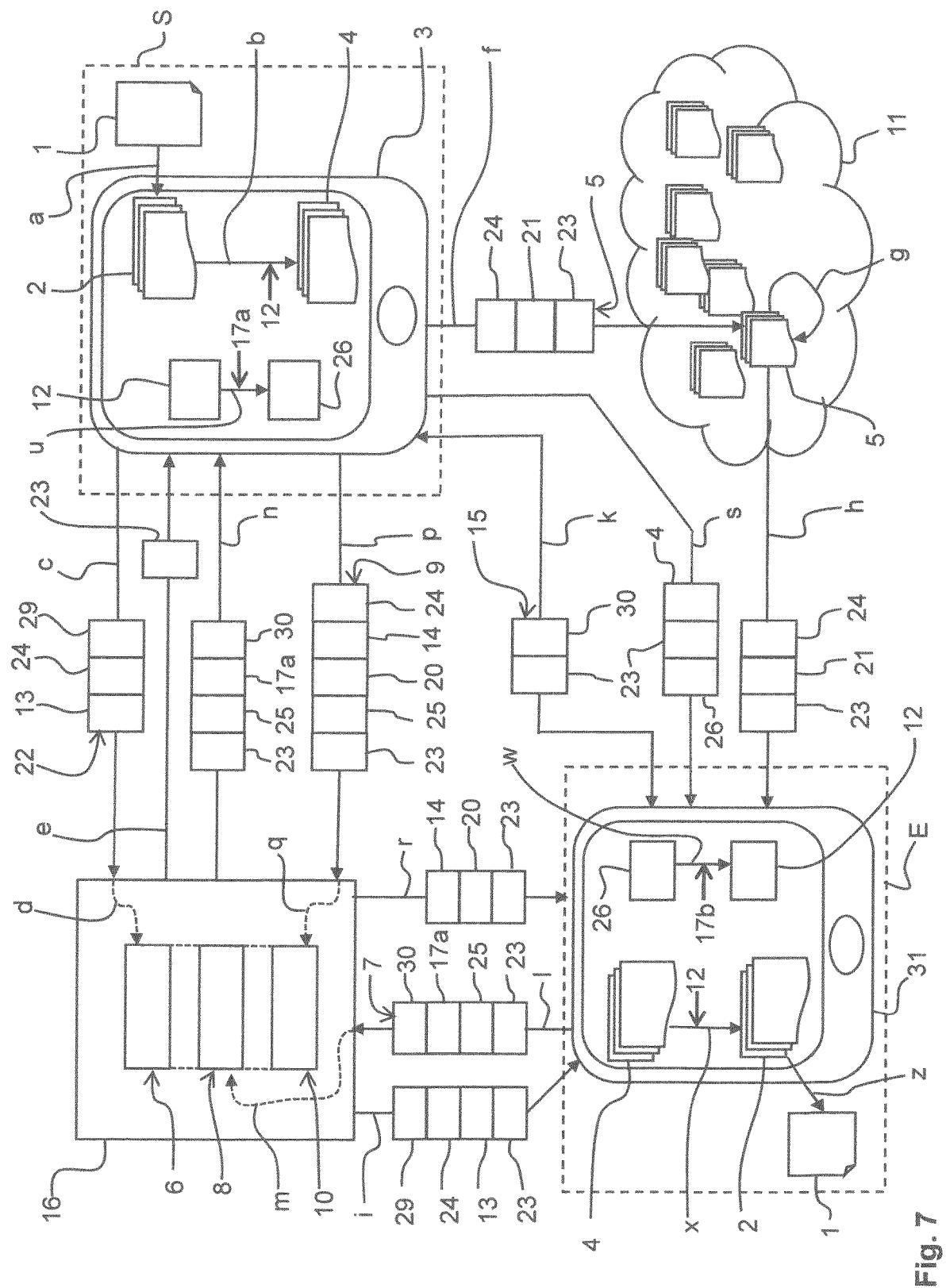
Figure 8:
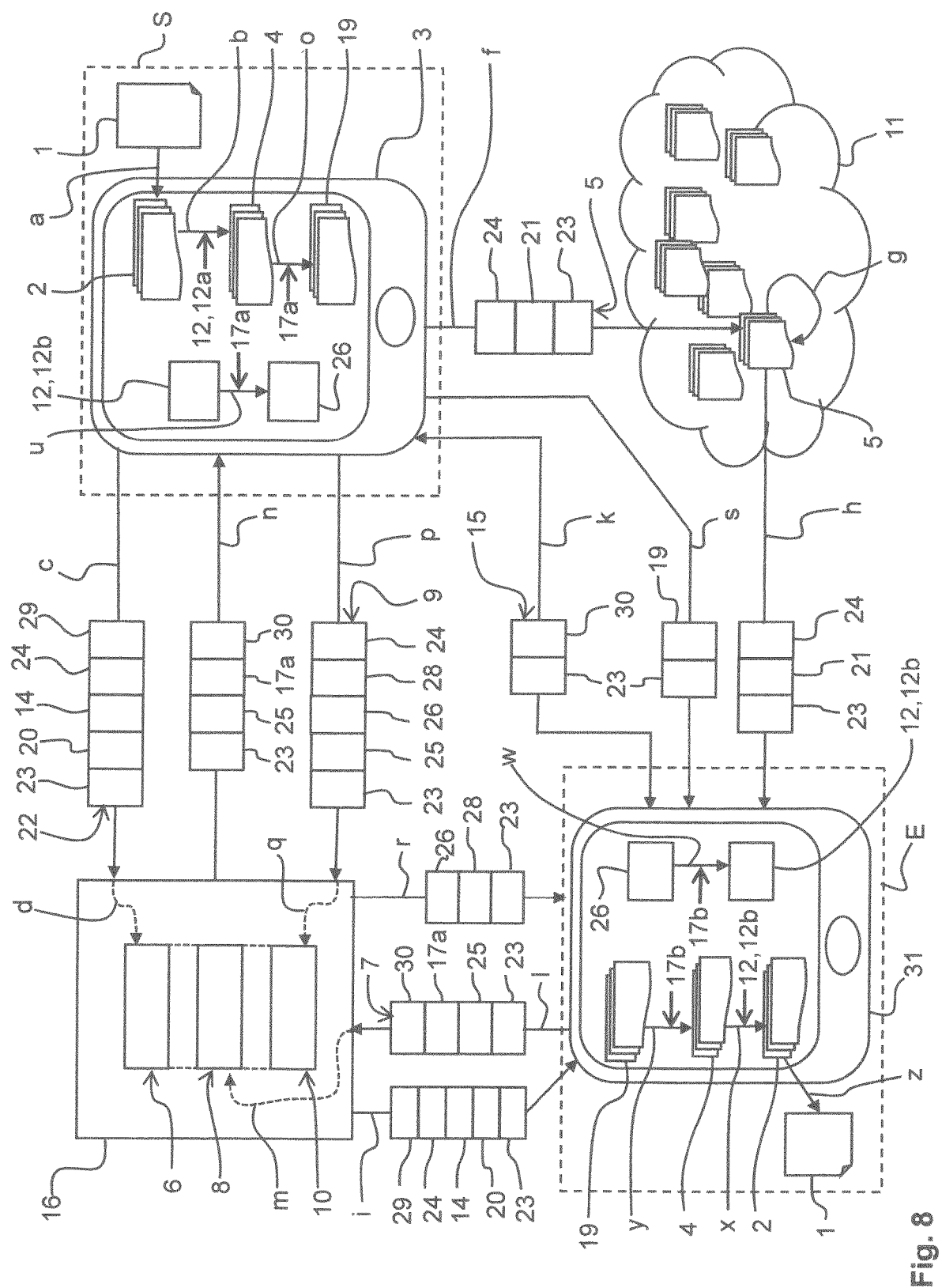
Figure 9:
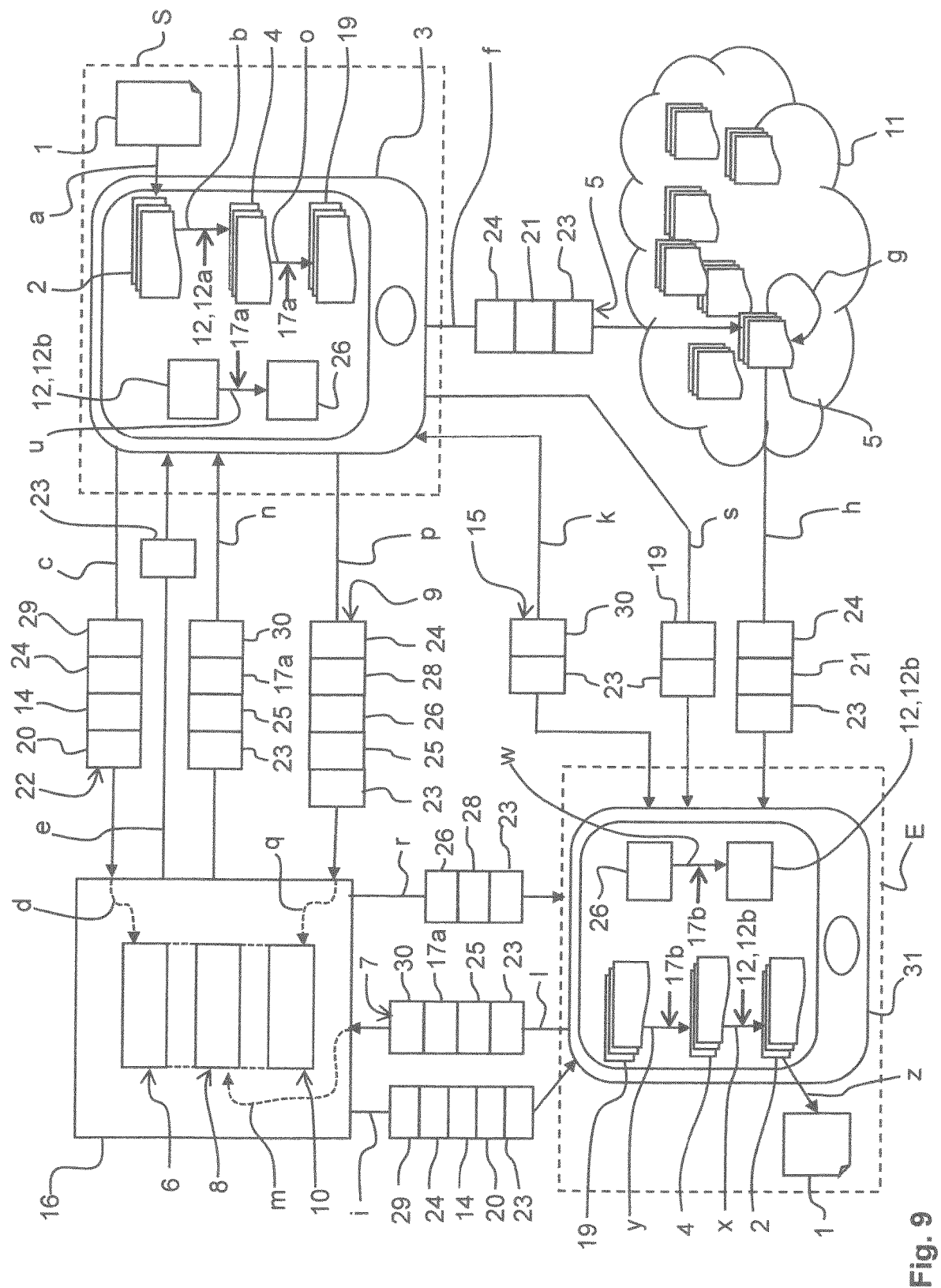

Advantageous embodiments of the invention are illustrated by way of example in the following figures. The figures show:

FIG. 1: a schematic representation of an embodiment of the invention, in which electronic information is encrypted by means of a public receiver key and decrypted by means of a private receiver key, and wherein first encrypted data are transmitted from a transmitter to a receiver via a blockchain, FIG. 2: a schematic representation of a variant of the embodiment of FIG. 1, wherein the first encrypted data are transmitted directly from the transmitter to the receiver by means of a data transmission step, FIG. 3: a schematic representation of a variant of the embodiment of FIG. 2, wherein an information identifier is generated from the blockchain, FIG. 4: a schematic representation of a further embodiment of the invention, in which the electronic information is encrypted with a public transmitter key or transmitter key and decrypted with a private transmitter key or transmitter key, and wherein the encrypted information is transmitted from the transmitter to the receiver via a database, FIG. 5: a schematic representation of a variant of the embodiment in FIG. 4, wherein the encrypted information is transmitted from the transmitter to the receiver via the blockchain by means of a first transaction step, FIG. 6: a schematic representation of a variant of the embodiment in FIG. 4, wherein the encrypted information is transmitted from the transmitter to the receiver via the blockchain by means of a third transaction step, FIG. 7: a schematic representation of a variant of the embodiment in FIG. 4, wherein the encrypted information is transmitted directly from the transmitter to the receiver by means of a data transmission step, FIG. 8: a schematic representation of an extended embodiment of FIG. 4, wherein the encrypted information is additionally encrypted by means of a public receiver key and decrypted by means of a private receiver key, and wherein third encrypted data are transmitted directly from the transmitter to the receiver by means of a data transmission step, and FIG. 9: a schematic representation of a variant of the embodiment of FIG. 8, wherein the information identifier is generated by the blockchain.

FIG. 1 shows an embodiment of the underlying invention, wherein information 1 is transmitted from a transmitter S to a receiver E. The transmitter S has a transmission terminal 3, which has electronic information 2. The electronic information. 2 is generated in particular by a conversion step a, in which, for example, the information 1 in the form of a document is converted into electronic information 2. Similarly, a reconversion step z is carried out in a receiver terminal 31 of the receiver E in order to get from the electronic information 2 to the information 1. In addition to the transmission terminal 3 and the receiver terminal 31, the system according to the invention comprises a blockchain 16 and a database 11, wherein the database 11 in particular is a cloud.

To transmit the electronic information 2 from the transmission terminal 3 to the receiver terminal 31, the following steps are performed. Firstly, a first transaction step c is performed, in which a first data record 22 is generated by the transmission terminal 3 and transferred to the blockchain 16. The data record 22 has an information identifier 23, a flash value 13 of the electronic information 2, a transmitter signature and transmitter information 24, and additional data 29. In a first verification step d, the first data record 22 is verified in the blockchain 16 and stored as a first verified data record 6. The first verified data record 6 enables the transmitter S to verify, in a tamper-proof manner, that he had the electronic information 2 at the time of the first transaction step c, since the flash value 13 of the electronic information 2 allows a unique assignment.

In an announcement step f, the transmission terminal 3 transmits an announcement data record 5 to the database 11. The announcement data record 5 also comprises the information identifier 23. In addition, the announcement data record 5 comprises a description 21 of the electronic information 2 and a transmitter signature and transmitter information 24. The description 21 is a description, not critical to the publication, of the electronic information 2, so that the announcement data record 5 may be published in the database 11 without revealing essential content of the electron information 2. Preferably, a processing step g is carried out in the database 11, in which step the announcement data record 5 is processed with a view to easier use. For example, keywords of the description 21 are stored separately so as to make it easier to find the announcement data record 5.

The transmission terminal 3 and the receiver terminal 31 have access to the verified data records in the blockchain 16. An access is understood to be an active reading of the verified data records of the blockchain 16 by the transmission terminal 3 or the receiver terminal 31 and/or a sending of the verified data records by the blockchain 16 to the transmission terminal 3 or the receiver terminal 31. In addition, the transmission terminal 3 and the receiver terminal 31 have access to data records in the database 11, wherein access to the database 11 is also to be understood as an active reading of the data records by the transmission terminal 3 or the receiver terminal 31 and/or a sending of the data records by the database 11 to the transmission terminal 3 or the receiver terminal 31.

By a first access i, the receiver terminal 31 accesses the first verified data record 6, wherein in particular it takes the information identifier 23 and the hash value 13 of the electronic information 2 from the first verified data record 6.

Through a cloud access h, the receiver terminal 31 receives the data of the announcement data record 5, namely the information identifier 23, the description 21 and the transmitter signature and transmitter information 24. Based on the information identifier 23, the receiver terminal 31 may associate the corresponding first verified data record 6 with the announcement data record 5.

If the receiver B is interested in the electronic information 2, an agreement step k may also be performed, in which an agreement data record 15 is exchanged between the receiver B and the transmitter S by the receiver terminal 31 and the transmission terminal 3. The agreement data record 15 comprises the information identifier 23 and an agreement 30. The agreement 30 is preferably a non-disclosure agreement, which is signed both by the receiver E and by the transmitter S. The non-disclosure agreement preferably ensures that the exchange of information between the receiver E and the transmitter S is not prejudicial to novelty for the information 1, or electronic information 2.

If the receiver E is interested in the electronic information 2, and if optionally the additional agreement step k with the agreement 30 has been performed, it performs a second transaction step I, wherein a second data record 7 is transferred to the blockchain 16. The second data record 7 comprises the information identifier 23, a receiver signature and receiver information 25, a public receiver key 17a and optionally the agreement 30. In a second verification step m, the second data record 7 is verified in the blockchain and stored as a second verified data record 8.

By a second access n, the transmission terminal 3 receives the data of the second verified data record 8, namely the information identifier 23, the receiver signature and receiver information 25, the public receiver key 17a and optionally the agreement 30. By means of the second verification step m, the transmitter S may verify in a tamper-proof manner that the receiver E has sent a request for the electronic information 2 with the information identifier 23 to the transmitter S.

In a first data encryption step t, the transmission terminal 3 encrypts the electronic information 2 by means of the public receiver key 17a, wherein the first encrypted data are generated. In the case shown in FIG. 1, the transmission terminal 3 obtains the public receiver key 17a directly through the second access n. Alternatively, the transmission terminal 3 may obtain the public receiver key 17a by searching a public database for the public receiver key 17a of the receiver E on the basis of the receiver signature and receiver information 25. After the first data encryption step t, a third transaction step p is performed, in which a third data record is transferred to the blockchain 16. The third data record comprises the information identifier 23, the receiver signature and receiver information 25, the first encrypted data 18 and the transmitter signature and transmitter information 24. In a third verification step q, the third data record 9 is verified in the blockchain 16 and stored as the third verified data record 10.

By means of a third access r, the receiver E extracts the information identifier 23 and the first encrypted data 18 from the blockchain 16 through the receiver terminal 31. In the receiver terminal 31, the first encrypted data 18, i.e. the electronic information 2 encrypted by means of the public receiver key 17a, is decrypted in a first data decryption step v by means of the private receiver key 17b of the receiver E. The receiver E thus receives the electronic information 2 by means of the first data decryption step v.

FIG. 2 shows a variant of the embodiment of the invention shown in FIG. 1, wherein the first encrypted data 18 are transmitted directly from the transmission terminal 3 to the receiver terminal 31 by means of a data transmission step s. In this way, the amount of data the blockchain 16 is kept low and a fast transmission of the first encrypted data 18 is achieved. Instead of the first encrypted data 18, the third data record 9 comprises the flash value 27 of the first encrypted data 18. The flash value 27 is stored in the third verified data record 10 in the blockchain 16, wherein the receiver terminal 31 may access the flash value 27 via the third access r. The flash value 27 of the first encrypted data 18 enables the receiver terminal 31 to compare whether the encrypted data 18 transmitted by the data transmission step s match the data verified in the blockchain 16.

FIG. 3 shows a variant of the embodiment of the invention shown in FIG. 2, wherein the information identifier 23 is generated by the blockchain 16 and stored in the first verified data record 6. The information identifier 23 generated by the blockchain 16 is transmitted by means of a transfer step e to the transmission terminal 3. All data records of the method therefore comprise the information identifier 23. The receiver terminal 31 takes the information identifier 23 from the first verified data record 6 from the blockchain 16.

FIG. 4 schematically illustrates another embodiment of the invention, wherein a more secure communication is made possible due to a double encryption. In the transmission terminal 3, the electronic information 2 is encrypted by means of a transmitter key 12 or a public transmitter key 12a, wherein the encrypted information 4 is generated. This is the information encryption step b. Moreover, in a second data encryption step u, the transmitter key 12 or the private transmitter key 12b is encrypted by means of the public receiver key 17a, wherein the second encrypted data 26 are generated. In this embodiment of the invention, the first data record 22 comprises a flash value 14 of the transmitter key 12 or the private transmitter key 12b and a flash value 20 of the encrypted information 4. By the transaction of the flash value 14 and the flash value 20, it may be verified by the transmitter S that he had the electronic information 2 at the time of the first transaction step c, since, by means of the first verification step d, the first data record 22 is stored in the blockchain 16 in a manner protected against modification.

The first access i gives the receiver access to the first verified data record 6 by means of the receiver terminal 31. The encrypted information 4 is transmitted via the database 11 from the transmission terminal 3 to the receiver terminal 31, wherein the encrypted information 4 is part of the announcement data record 5 and the receiver terminal 31 may access the announcement data record through the cloud access h. The second encrypted data 26 are transmitted via the blockchain 16 from the transmission terminal 3 to the receiver terminal 31, wherein the second encrypted data 26 are part of the third data record 9, which is transferred in the third transaction step p to the blockchain 16. The receiver terminal 31, via the third access r, has access to the third verified data record 10, in which the second encrypted data 26 are stored in a manner protected against modification.

The receiver E may access the electronic information 2 through the receiver terminal 31 by first performing a second data decryption step w, in which the second encrypted data 26 are decrypted using the private receiver key 17b. Through the second data decryption step w, the receiver E thus arrives at the transmitter key 12 or the private transmitter key 12b. In an information decryption step x, the encrypted information 4 is decrypted by means of the transmitter key 12 or the private transmitter key 12b, wherein the electronic information 2 is generated, so that the electronic information 2 is present in the receiver terminal 31. From the electronic information 2, the receiver E may arrive at the information 1 by means of a reconversion step z. This variant has the advantage that the second encrypted data 26 and the encrypted information 4 are transmitted separately from each other and two decryption steps are necessary to get to the electronic information 2, so that a secure transmission of the electronic information 2 is achieved.

FIG. 5 shows a variant of the embodiment of FIG. 4, in which variant the encrypted information 4 and the second encrypted data 26 are transmitted via the blockchain 16 from the transmission terminal 3 to the receiver terminal 31. The encrypted information 4 is part of the first data record 22, which is transferred in the first transaction step c to the blockchain 16. The first data record 22 is stored in the blockchain 16 by a first verification step d as a first verified data record 6. The receiver E has the possibility to get to the encrypted information 4 by means of the receiver terminal 31 via the first access i. In this variant of the invention, both the encrypted information 4 and the second encrypted data 26 are transmitted via the blockchain 16. Otherwise, the same method steps are carried out as in the embodiment of FIG. 4.

FIG. 6 shows another variant of the embodiment of FIG. 4, wherein, this variant, the encrypted information 4 and the second encrypted data 26 are transmitted via the blockchain 16 from the transmission terminal 3 to the receiver terminal 31. In this variant, the encrypted information 4 and the second encrypted data 26 are parts of the third data record 9 and are transferred into the blockchain 16 with the third transaction step p. The third data record 9 is stored in the blockchain 16 in a third verification step q as a third verified data record 10. The receiver terminal 31 then has the possibility, via the third access r, to read the encrypted information 4 and the second encrypted data 26 from the blockchain 16. In the receiver terminal 31, the transmitter key 12 or the private transmitter key 12b is obtained from the second encrypted data 26 by the second data decryption step w. By means of the transmitter key 12 or the private transmitter key 12b, the information decryption step x is performed, wherein the electronic information 2 is obtained. This variant has the advantage that the transmitter S does not store the encrypted information 4 in the blockchain 16 until the receiver E has requested the electronic information 2 with the information identifier 23 through the second transaction step I, so that the transmitter S retains sovereignty over the electronic information 2, or the encrypted electronic information 4.

FIG. 7 schematically shows a further variant of the embodiment of FIG. 4, in which variant the encrypted information 4 and the second encrypted data 26 are transmitted by means of a data transmission step s directly from the transmission terminal 3 to the receiver terminal 31. In this embodiment of the invention the electronic information 2 is symmetrically encrypted in the information encryption step b by means of the sensor key 12, wherein the encrypted information 4 is generated. The transmitter key 12 is encrypted by means of the public receiver key 17a, wherein the second encrypted data 26 are generated. These data are then transmitted in the data transmission step s to the receiver E. In the variant of FIG. 7, the information identifier 23 is generated by the blockchain transmitted by the transfer step e from the blockchain 16 to the transmission terminal 3. Alternatively, the information identifier 23 may also be generated in the transmission terminal 3. The variant of FIG. 7 has the advantage that the information may be exchanged quickly between transmitter S and receiver E by the data transfer step s, without the amount of data in the blockchain 16 becoming too large.

A further embodiment of the invention is shown in FIG. 8, wherein the security of the information transmission is increased, since three decryption steps are required to reach the electronic information 2. In the transmission terminal 3, the electronic information 2 is encrypted by an information encryption step b using the transmitter key 12 or the public transmitter key 12a, wherein the encrypted information 4 is generated. The encrypted information 4 is additionally encrypted by means of the public receiver key 17a in a third data encryption step o, wherein third encrypted data 19 are generated. In addition, the transmitter key 12 or the private transmitter key 12b is encrypted by means of the public receiver key 17a by means of a second data encryption step u, wherein the second encrypted data 26 are generated. The second encrypted data 26 are part of the third data record 9 and are transferred to the blockchain 16 with the third transaction step p. The receiver terminal 31 reads the second encrypted data 26 by means of the third access r. The third encrypted data 19, on the other hand, are transmitted directly from the transmission terminal 3 to the receiver terminal 31 by means of the data transfer step s.

The method may additionally also comprise the following steps:
  a third transaction step yyy, in which a third data record bbb is generated by the receiver terminal 31 and is transferred to the blockchain 16, and
  a third verification step zzz, in which the third data record bbb is stored.

The receiver E obtains the electronic information 2 in that the second data decryption step w is firstly performed by the receiver terminal 31, wherein the second encrypted data 26 are decrypted by means of the private receiver key 17b and the transmitter key 12 or the private transmitter key 12b is generated. Then, the third encrypted data 19 are decrypted, wherein a third data decryption step y is first performed, in which the third encrypted data 19 are decrypted by means of the private receiver key 17b so that the encrypted information 4 is present in the receiver terminal 31. The encrypted information 4 is then decrypted in the information decryption step x by means of the transmitter key 12 or the private transmitter key 12b, wherein the electronic information 2 is generated. This embodiment is particularly secure because three decryption steps are necessary and the third encrypted data 19 and the second encrypted data 26 are transmitted independently to the receiver terminal. In addition, it may be ensured that the transmitter S had the electronic information 2 at the time of the third transaction step p, since the hash value 28 of the third encrypted data 19 is part of the third data record 9. Furthermore, the hash value 28 of the third encrypted data 19 enables the receiver E to verify whether the correct third encrypted data 19 was actually transmitted in the data transmission step s.

FIG. 9 shows a variant of the embodiment of FIG. 8, wherein the information identifier 23 is generated by the blockchain 16 and the first verified data record 6 comprises the information identifier 23. The information identifier 23 generated by the blockchain 16 is transmitted by means of a transfer step e to the transmission terminal 3. All data records of the method have the information identifier 23 for identifying the information.

LIST OF REFERENCE SIGNS

1 Information
2 Electronic information
3 Transmission terminal
4 Encrypted information
5 Announcement data record
6 First verified data record
7 Second data record
8 Second verified data record
9 Third data record
10 Third verified data record
11 Database, cloud
12 Transmitter key
12a Public transmitter key
12b Private transmitter key
13 Hash value of the electronic information 2
14 Hash value of transmitter key 12 or private transmitter key 12b
15 Agreement data record
16 Blockchain
17a Public receiver key
17b Private receiver key
18 First encrypted data (electronic information 2 encrypted with the public receiver key 17a)
19 Third encrypted data (encrypted information 4 encrypted with the public receiver key 17a)
20 Hash value of the encrypted information 4
21 Description of the electronic information 2
22 first data record
23 Information identifier
24 Transmitter signature and transmitter information
25 Receiver signature and receiver information 26 Second encrypted data (transmitter key 12 encrypted with the public receiver key 17*a* or public transmitter key 12*a*)
27 Hash value of the first encrypted data 18
28 Hash value of the third encrypted data 19
29 Additional data
30 Agreement
31 Receiver terminal
E Receiver
S Transmitter
a Conversion step
b information encryption step
c First transaction step
d First verification step
e Transfer step
f Announcement step
g Processing step
h Cloud access
i First access
k Agreement step
l Second transaction step
m Second verification step
n Second access
o Third data encryption step
p Third transaction step
q Third verification step
r Third access
s Data transmission step
t First data encryption step
u Second data encryption step
v First data decryption step
w Second data decryption step
x Information decryption step
y Third data decryption step
x Reconversion step

The invention claimed is:

1. A method for information transmission, wherein electronic information is transmitted from a transmission terminal of a transmitter(S) to a receiver terminal of a receiver (E), the method comprising the following steps:
  a first transaction step (c), in which a first data record comprising at least one hash value is generated by the transmission terminal and the first data record is transferred to a blockchain,
  a first verification step (d), in which the first data record is verified in the blockchain, and stored as a first verified data record,
  a second transaction step (I), in which a second data record comprising at least a public receiver key or a receiver identifier is generated by the receiver terminal and the second data record is transferred to the blockchain,
  a second verification step (m), in which the second data record is verified in the blockchain and stored as a second verified data record,
  a third transaction step (p), in which a third data record is generated by the transmission terminal and transferred to the blockchain,
  a third verification step (q), in which the third data record is verified in the blockchain and stored as a third verified data record,
  a data encryption step (o, t, u), in which data encrypted by means of the public receiver key are generated by the transmission terminal,
  a transmission step, in which the encrypted data are transmitted to the receiver terminal, and
  a data description step (v, w, y), in which the electronic information is made accessible to the receiver (E) by the encrypted data being decrypted by the receiver terminal by means of private receiver key;
  wherein an information identifier is assigned to the electronic information,
  wherein the information identifier is generated by the transmission terminal and transferred to the blockchain as part of the first data record in the first transaction step (c), or
  wherein the information identifier is generated by the blockchain and transferred to the transmission terminal in a transfer step (e),
  wherein at least the second data record and the third data record comprise the information identifier; and
  wherein an announcement step (f) is carried out, in which an announcement data record is stored in a database to which the receiver (E) has access via the receiver terminal, the announcement data record comprising at least a description, intended for publication, of the electronic information and the information identifier.

2. The method according to claim 1, wherein at least the second data record and the third data record comprise the information identifier, wherein the information identifier is one of the hash values or a combination of the hash values.

3. The method according to claim 1, wherein the database is a cloud, to which the receiver (E) has access via the receiver terminal, the announcement data record comprising at least a description, intended for publication, of the electronic information and the information identifier.

4. The method according to claim 1, wherein the database carries out a processing step (g) in which the description of the electronic information and the information identifier are technically processed.

5. The method according to claim 1, wherein the method comprises an agreement step (k), in which an agreement for the information transmission is exchanged between the transmitter(S) and the receiver (E).

6. The method according to claim 1, wherein the method comprises an agreement step (k), in which an agreement for information transmission is exchanged between the transmitter(S) and the receiver (E), and wherein the agreement or a hash value of the agreement is stored as a part of the second data record in the blockchain.

7. The method according to claim 1, wherein
  the transmission terminal generates a hash value of the electronic information and the first data record comprises said hash value,
  in that the method comprises a first data encryption step (t), in which the information is encrypted by the transmission terminal with the public receiver key, wherein first encrypted data are generated, and
  in that the method comprises a first data decryption step (v), in which the first encrypted data are decrypted by the receiver terminal with the private receiver key, wherein the electronic information is obtained.

8. The method according to claim 7, wherein comprises a data transmission step(s), in which the first encrypted data are transmitted directly from the transmission terminal to the receiver terminal, and wherein
  the third data record has a hash value of the first encrypted data.

9. The method according to claim 6, wherein the transmission terminal generates a hash value of the encrypted data and a hash value of a transmitter key or a public transmitter key, wherein the first data record comprises these two hash values.

10. The method according to claim 6, wherein the encrypted data is part of an announcement data record, so that the encrypted data may be accessed by the receiver terminal via a database.

11. The method according to claim 6, wherein the encrypted data is part of the first data record or a third data record, so that the encrypted data may be accessed by the receiver terminal via the blockchain.

12. The method according to claim 6, wherein the method comprises a data transmission step(s), in which the encrypted data is transmitted directly from the transmission terminal to the receiver terminal.

13. The method according to claim 6, the method comprises the following steps:
- a third data encryption step (o), in which the transmission terminal encrypts the encrypted data by means of the public receiver key, wherein third encrypted data are generated,
- a data transmission step(s), in which the third encrypted data are transmitted from the transmission terminal (3) of the transmitter(S) to the receiver terminal, and
- a third data decryption step (y), in which the third encrypted data are decrypted by the receiver terminal by means of the private receiver key, wherein the encrypted data is obtained.

14. The method according to claim 1, wherein the method comprises a conversion step (a), in which information is converted into the electronic information.

15. The method according to claim 1, wherein the method comprises the following steps:
- a third transaction step (yyy), in which a third data record (bbb) is generated by the receiver terminal and is transferred to the blockchain, and
- a third verification step (zzz), in which the third data record (bbb) is stored.

16. A method for information transmission, wherein electronic information is transmitted from a transmission terminal of a transmitter(S) to a receiver terminal of a receiver (E), the method comprising the following steps:
- a first transaction step (c), in which a first data record comprising at least one hash value is generated by the transmission terminal and the first data record is transferred to a blockchain,
- a first verification step (d), in which the first data record is verified in the blockchain, and stored as a first verified data record,
- a second transaction step (l), in which a second data record comprising at least a public receiver key or a receiver identifier is generated by the receiver terminal and the second data record is transferred to the blockchain,
- a second verification step (m), in which the second data record is verified in the blockchain and stored as a second verified data record,
- a data encryption step (o, t, u), in which data encrypted by means of the public receiver key are generated by the transmission terminal,
- a transmission step, in which the encrypted data are transmitted to the receiver terminal, and
- a data description step (v, w, y), in which the electronic information is made accessible to the receiver (E) by the encrypted data being decrypted by the receiver terminal by means of private receiver key;

wherein the method further comprises the following steps:
- an information encryption step (b), in which the electronic information is encrypted by the transmission terminal by means of a transmitter key or a public transmitter key, wherein encrypted information is generated,
- a second data encryption step (u), in which the transmitter key or the public transmitter key is encrypted by the transmission terminal by means of the public receiver key, wherein second encrypted data are generated,
- a second data decryption step (w), in which the second encrypted data are decrypted by the receiver terminal by means of the private receiver key, wherein the transmitter key or the public transmitter key is obtained, and
- an information decryption step (x), in which the encrypted information is decrypted by the receiver terminal by means of the transmitter key or the public transmitter key, wherein the electronic information is obtained.

17. A system for information transmission, comprising a transmission terminal, a receiver terminal and a blockchain, wherein the transmission terminal, the receiver terminal and the blockchain are designed to carry out the method from claim 1.

* * * * *